(12) United States Patent
Matsumoto (10) Patent No.: US 11,884,236 B2
(45) Date of Patent: Jan. 30, 2024

(54) ELECTRONIC KEY SYSTEM

(71) Applicant: SUBARU CORPORATION, Tokyo (JP)

(72) Inventor: Koki Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/947,496

(22) Filed: Sep. 19, 2022

(65) Prior Publication Data

US 2023/0097837 A1 Mar. 30, 2023

(30) Foreign Application Priority Data

Sep. 29, 2021 (JP) .................................. 2021-159663

(51) Int. Cl.
*B60R 25/31* (2013.01)
*B60R 25/24* (2013.01)

(52) U.S. Cl.
CPC ............ *B60R 25/241* (2013.01); *B60R 25/31* (2013.01)

(58) Field of Classification Search
CPC ...... B60R 25/241; B60R 25/31; B60R 25/245
See application file for complete search history.

(56) References Cited

U.S. PATENT DOCUMENTS

| | | | | |
|---|---|---|---|---|
| 9,800,570 | B1* | 10/2017 | Bleisch | H04W 12/082 |
| 2005/0184586 | A1* | 8/2005 | Cheng | B60R 25/24 |
| | | | | 307/10.2 |
| 2015/0120151 | A1* | 4/2015 | Akay | B60R 25/01 |
| | | | | 701/1 |
| 2016/0306455 | A1* | 10/2016 | Buttolo | G06F 3/011 |
| 2017/0101110 | A1* | 4/2017 | Yoo | B60W 50/08 |
| 2017/0342750 | A1* | 11/2017 | Hiramine | G07C 9/00309 |
| 2018/0268628 | A1* | 9/2018 | Jain | B60R 25/25 |
| 2019/0168712 | A1* | 6/2019 | Yakovenko | B60R 25/24 |
| 2020/0202646 | A1* | 6/2020 | Ammoura | G07C 9/00309 |
| 2021/0339706 | A1* | 11/2021 | Reinhardt | G07C 9/00309 |

FOREIGN PATENT DOCUMENTS

JP 2010-275701 A 12/2010

* cited by examiner

*Primary Examiner* — Nay Tun
(74) *Attorney, Agent, or Firm* — TROUTMAN PEPPER HAMILTON SANDERS LLP (57) ABSTRACT

An electronic key system includes a door unit, an installed device, a portable device, at least one processor, and a storage medium storing. The storage medium stores a program that causes the processor to execute a composite authentication process and a simple authentication process. The composite authentication process permits unlocking of the door unit if all of the following conditions are satisfied: key information output from the portable device matches pre-registered key information; a user's motion matches pre-registered first motion information; and the motion matches pre-registered second motion information. The simple authentication process is executed during the time from locking of the door unit to elapse of a preset time or from locking of the door unit to when the portable device is located outside an authentication notification area. The simple authentication process permits unlocking of the door unit if the key information matches the pre-registered key information.

12 Claims, 7 Drawing Sheets

ELECTRONIC KEY SYSTEM

CROSS-REFERENCE TO RELATED APPLICATION

The present application claims priority from Japanese Patent Application No. 2021-159663 filed on Sep. 29, 2021, the entire contents of which are hereby incorporated by reference.

BACKGROUND

The disclosure relates to an electronic key system configured to control locking and unlocking of a lock object in accordance with the result of authentication.

Electronic key systems known in the art lock and unlock a vehicle door via wireless communication with a portable device. Such an electronic key system is configured to, for example, when a portable device carried by a user is within the communication range of the vehicle, allow the user to lock and unlock the vehicle with a simple operation such as touching the door handle, without the user inputting an operation on an operation unit of the portable device.

Techniques for preventing crimes such as so-called relay attacks have been proposed. In a relay attack, an attacker waits until a user is away from a vehicle, and when such an opportune moment arises, the attacker uses a relay device to establish communication between the vehicle and a portable device that is out of the communication range of the vehicle to thereby perform unauthorized unlocking or other unwanted attacks.

For example, Japanese Unexamined Patent Application Publication (JP-A) No. 2010-275701 discloses a technique that prevents relay attacks by using, as a condition to permit locking and unlocking of a vehicle door, user authentication based on detection of a user's tap motion on a portable device.

SUMMARY

An aspect of the disclosure provides an electronic key system including a door unit, an installed device, a portable device, one or more processors, and a storage medium. The door unit is to be disposed in a lock object. The installed device is to be disposed in the lock object. The portable device is capable of communicating with the installed device in an authentication notification area, and capable of being carried by a user. The non-transitory computer-readable storage medium is configured to store a program that is to be executed by the one or more processors. The program includes one or more instructions. The one or more instructions cause the one or more processors to execute a composite authentication process and a simple authentication process. The composite authentication process permits the door unit to be unlocked provided that all of conditions are satisfied. The conditions includes that key information output from the portable device matches pre-registered key information, that a motion performed by the user matches pre-registered first motion information, and that the motion matches pre-registered second motion information. The simple authentication process is executed during a period of time from when the door unit is locked to when a preset time elapses, or during a period of time from when the door unit is locked to when the portable device is located outside the authentication notification area. The simple authentication process permits the door unit to be unlocked provided that a condition is satisfied. The condition consists of that the key information matches the pre-registered key information.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

As with the technique disclosed in JP-A No. 2010-275701, electronic key systems are typically desired to provide security against unauthorized unlocking executed by a relay attack or other methods. At the same time, electronic key systems are also desired to enhance convenience for the user in performing an unlock operation.

It is desirable to provide an electronic key system that may make it possible to enhance user convenience and also provide sufficient security.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

As for features illustrated in the drawings to which reference is made in describing the embodiment, parts or portions to be used in implementing the embodiment, and features in the vicinity of such parts or portions are extracted and schematically illustrated.

A configuration of an electronic key system 1 according to the embodiment is described below with reference to FIGS. 1 and 2.

Figure 1:
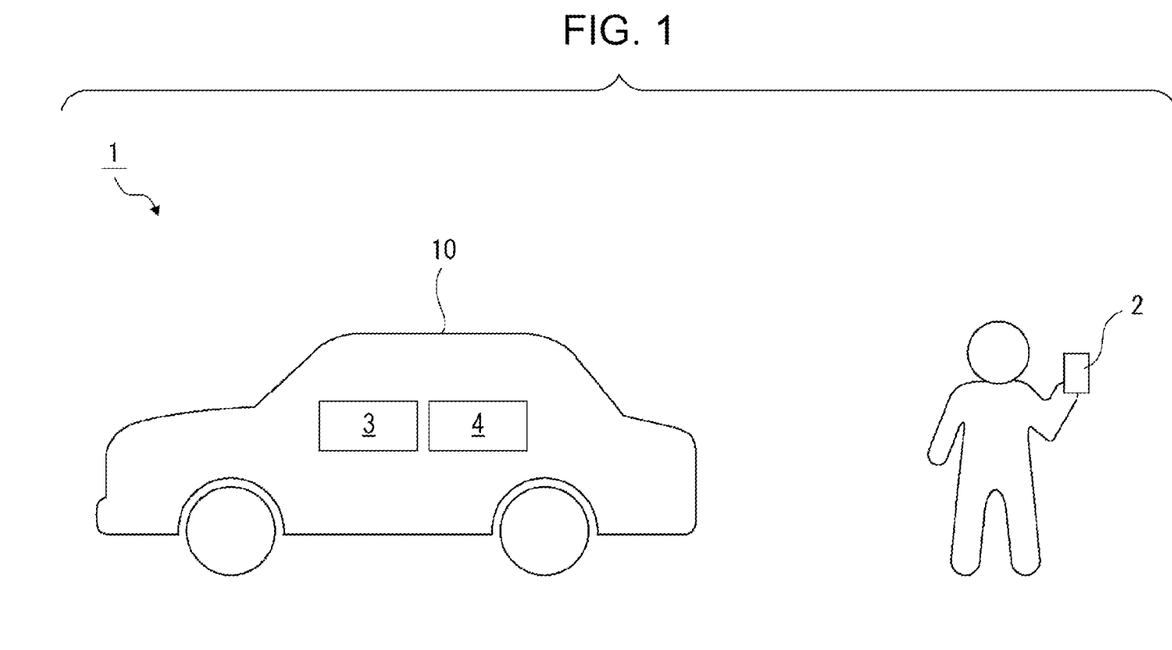
FIG. 1 illustrates an overview of an electronic key system.
Figure 2:
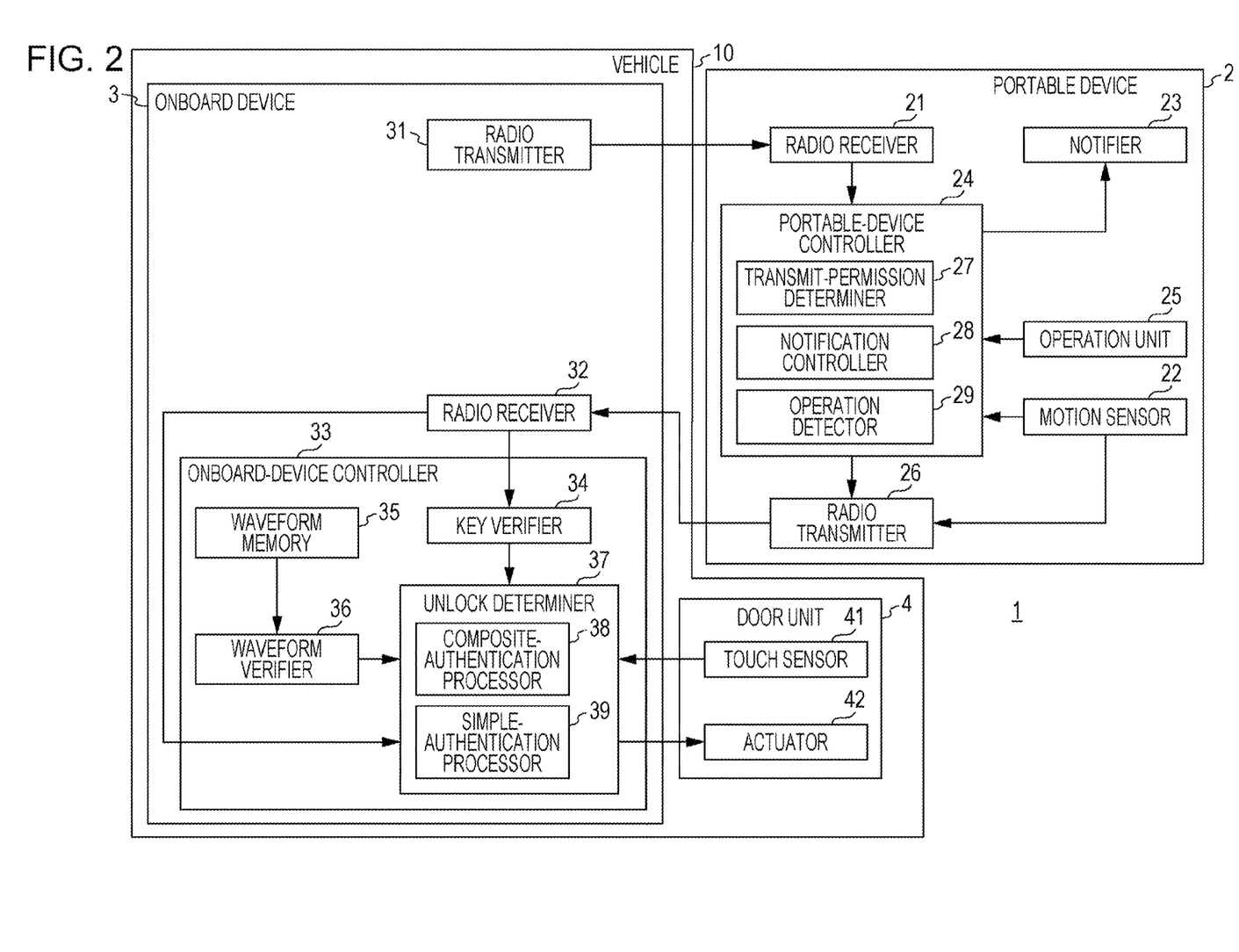
FIG. 2 is a block diagram illustrating an exemplary configuration of the electronic key system.

As illustrated in FIG. 1, the electronic key system 1 includes a portable device 2, an onboard device 3, and a door unit 4. The portable device 2 is capable of being carried by a user. The onboard device 3 is disposed in a vehicle 10. In one embodiment, the onboard device 3 may serve as an "installed device", and the vehicle 10 may serve as a "lock object". The door unit 4 is disposed at a door of the vehicle 10. The portable device 2 and the onboard device 3 are capable of communicating with each other.

Suitable examples of the vehicle 10 include various vehicles such as vehicles with an internal combustion engine, electric vehicles, and hybrid vehicles.

With the electronic key system 1, the door unit 4 is locked by, for example, an operation made on an operation unit 25 (see FIG. 2) of the portable device 2, or a touch on the door handle of the vehicle 10.

The door unit 4 of the vehicle 10 is unlocked in response to a user's operation on the operation unit 25. In a case where the portable device 2 is within the communication range of the onboard device 3, the door unit 4 is unlocked provided that the following condition is satisfied: a vibration waveform signal representative of a user's motion detected by a motion sensor 22 of the portable device 2 coincides with, within a predetermined tolerance, a vibration waveform signal represented by pre-registered motion information. This configuration may allow the user to, for example, unlock the door unit 4 by performing a specific motion when approaching the vehicle 10, without operating the operation unit 25 of the portable device 2.

The portable device 2 is, for example, a smartphone, a dedicated electronic key, or other device. As illustrated in FIG. 2, the portable device 2 includes a radio receiver 21, the motion sensor 22, a notifier 23, a portable-device controller 24, the operation unit 25, and a radio transmitter 26.

The radio receiver 21 is a receiver used to receive, from the onboard device 3, a modulated signal obtained by modulating a preset polling signal. The modulated signal includes a first modulated signal and a second modulated signal. The first modulated signal is, for example, a low frequency (LF) signal. The second modulated signal is, for example, a signal equivalent to an LF signal with a transmission range greater than that of the first modulated signal.

The radio receiver 21 receives the first modulated signal, the second modulated signal, or other signals from the onboard device 3.

Figure 3:
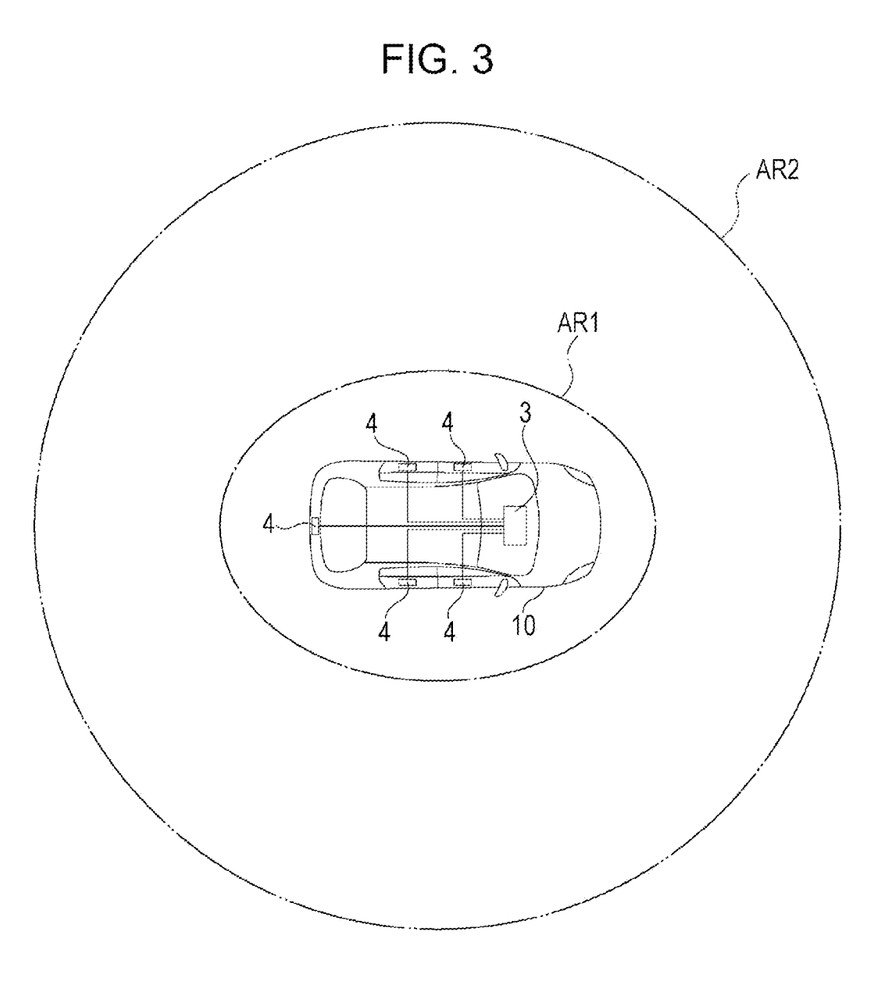
FIG. 3 conceptually illustrates areas where a portable device is located relative to an onboard device.

FIG. 3 schematically illustrates a lock-object vicinity area AR1, which is an area where the radio receiver 21 is able to receive the first modulated signal from the onboard device 3. The lock-object vicinity area AR1 is set as, for example, an area within a radius of about two meters from the onboard device 3. The lock-object vicinity area AR1 is defined as an area where unlocking by so-called smart access can be performed. Whether the portable device 2 is inside the lock-object vicinity area AR1 is determined by the radio receiver 21 receiving the first modulated signal at regular intervals from the onboard device 3.

FIG. 3 also schematically illustrates an authentication notification area AR2, which is an area where the radio receiver 21 is able to receive the second modulated signal from the onboard device 3. The authentication notification area AR2 is set as, for example, an area within a radius of about 10 meters from the onboard device 3. Whether the portable device 2 is within the authentication notification area AR2 is determined by the radio receiver 21 receiving the second modulated signal at regular intervals from the onboard device 3.

The radio receiver 21 demodulates a received modulated signal and supplies the resulting signal to the portable-device controller 24.

The motion sensor 22 is an acceleration sensor, a gyroscope sensor, or other sensor. The motion sensor 22 detects a vibration waveform signal representative of a vibration or other motion applied to the portable device 2. The vibration waveform signal is detected, for example, when a user carrying the portable device 2 makes a motion such as tapping the portable device 2 a predetermined number of times, when the user carrying the portable device 2 makes a motion such as walking or stepping, or when a user makes a motion such as picking up the portable device 2 that has been left somewhere to thereby carry the portable device 2 again.

The motion sensor 22 supplies the detected vibration waveform signal to the portable-device controller 24 and the radio transmitter 26.

The notifier 23 includes a vibrator, a speaker, or other component (not illustrated). The notifier 23 causes a vibration or sound to be generated via a vibrator, a speaker, or other component in response to a notification control signal supplied from the portable-device controller 24. This may allow the user to recognize by the vibration or sound that the portable device 2 being carried by the user has entered the authentication notification area AR2.

The portable-device controller 24 is capable of serving as a transmit-permission determiner 27, a notification controller 28, and an operation detector 29. In one example, the portable-device controller 24 may include one or more processors, and a memory configured to store a program that is to be executed by the one or more processors. The program includes one or more instructions. The one or more instructions cause the one or more processors to execute a process for implementing various functions mentioned above.

The transmit-permission determiner 27 determines, in a case where the radio receiver 21 receives the second modulated signal, that the portable device 2 is located inside the authentication notification area AR2. The transmit-permission determiner 27 then supplies the following signals to the radio transmitter 26: a transmit permission signal for permitting transmission of a vibration waveform signal detected by the motion sensor 22; and a key signal serving as key identifier (ID) information previously set for the portable device 2.

In a case where the second modulated signal has not been received by the radio receiver 21 for a predetermined time, or in a case where a vibration waveform signal has not been supplied from the motion sensor 22 for a predetermined time, the transmit-permission determiner 27 stops supplying a transmit permission signal to the radio transmitter 26 until the second modulated signal is supplied from the radio receiver 21 again.

The notification controller 28 determines, in a case where the second modulated signal is supplied from the radio receiver 21, that the portable device 2 is located inside the authentication notification area AR2. The notification controller 28 then executes a control that causes the notifier 23 to output a notification control signal in response to a vibration waveform signal supplied from the motion sensor 22.

The operation detector 29 supplies, in response to a user's operation on the operation unit 25, an operation signal that requests either one of locking and unlocking of the door unit 4 to the radio transmitter 26.

The radio transmitter 26 is a transmitter used to modulate a signal, such as a vibration waveform signal supplied from the motion sensor 22 or a key signal set for the portable device 2, into, for example, a radio frequency (RF) signal, and transmit the resulting signal. The radio transmitter 26 outputs the RF signal in response to the second modulated signal received from the onboard device 3.

The radio transmitter 26 outputs the modulated RF signal toward the onboard device 3, provided that a transmit permission signal has been supplied from the transmit-permission determiner 27.

Although the foregoing description of the embodiment is directed to an exemplary configuration in which the portable device 2 transmits an RF signal and the onboard device 3 transmits an LF signal and a signal equivalent to an LF signal, each of these devices may not necessarily transmit the signals mentioned above but may transmit other signals.

The radio transmitter 26 outputs, in response to an operation signal being supplied from the operation unit 25, a signal obtained by modulating the operation signal, a key signal, or other signal to the onboard device 3.

The onboard device 3 includes a radio transmitter 31, a radio receiver 32, and an onboard-device controller 33.

The radio transmitter 31 is a transmitter used to transmit a modulated signal obtained by modulating a preset polling signal. The radio transmitter 31 repeatedly transmits various modulated signals at preset intervals of time.

The radio receiver 32 is a receiver used to receive an RF signal from the portable device 2. The radio receiver 32 receives, from the portable device 2, various signals modulated into RF signals, such as a key signal, a vibration waveform signal, and an operation signal. The radio receiver 32 demodulates various received signals and supplies the resulting signals to the onboard-device controller 33.

The onboard-device controller 33 is capable of serving as a key verifier 34, a waveform memory 35, a waveform verifier 36, and an unlock determiner 37. In one example, the onboard-device controller 33 may include one or more processors, and a memory configured to store a program that is to be executed by the one or more processors. The program includes one or more instructions. The one or more instructions cause the one or more processors to execute a process for implementing various functions mentioned above.

The key verifier 34 verifies a key signal supplied from the radio receiver 32 against pre-registered key information previously registered in the onboard device 3. The key verifier 34 thus determines whether the key signal matches the pre-registered key information, that is, whether the portable device 2 is a portable device associated with the onboard device 3.

If the key signal coincides with the pre-registered key information, the key verifier 34 determines that the key signal matches the pre-registered key information. At this time, the key verifier 34 supplies a key-verification complete signal to the unlock determiner 37.

The key verifier 34 determines, based on the condition of radio reception from the portable device 2 by onboard antennas (not illustrated) (radio receiver 32) disposed at various locations on the vehicle 10, whether the portable device 2 is located inside the vehicle cabin or whether the portable device 2 is located outside the vehicle cabin and in the vicinity of the vehicle 10, that is, whether the portable device 2 is located inside the lock-object vicinity area AR1. The key verifier 34 supplies the verification result to the unlock determiner 37.

In the waveform memory 35, for each of a plurality of authentication motions to be performed by the user for unlocking, a vibration waveform signal corresponding to each authentication motion is previously registered as pre-registered motion information. Such pre-registration of motion information into the waveform memory 35 can be performed at a vehicle dealer or other place for one or more persons. Accordingly, in addition to an owner of the vehicle 10, a vibration waveform signal representing an authentication motion performed by, for example, the owner's family member or other persons can be registered for each individual user as pre-registered motion information.

With regard to such authentication motions, the same motion performed by different persons results in different vibration waveform signals. Accordingly, when authentication motions are registered for individual users in advance as pre-registered motion information, and the pre-registered motion information is used for verification against a vibration waveform signal detected by the portable device 2, user authentication can be performed.

The following description is directed to an exemplary case where, as pre-registered motion information for a given user, pre-registered first motion information, pre-registered second motion information, and pre-registered third motion information are previously registered in the waveform memory 35. An example of the pre-registered first motion information is a vibration waveform signal representing an authentication motion different from an authentication motion represented by the pre-registered second motion information. The pre-registered third motion information is to be used as a pair with the pre-registered second motion information. A vibration waveform signal to be previously registered as the pre-registered third motion information is a vibration waveform signal representing a motion that, even in situations where it is difficult to perform an authentication motion previously registered as the pre-registered second motion information, can be performed as an alternative authentication motion.

A vibration waveform signal to be registered as the pre-registered first motion information is, for example, a vibration waveform signal resulting from an authentication motion that the user carrying the portable device 2 intentionally performs on the portable device 2. In the present case, for example, a vibration waveform signal representing a user's motion of tapping the portable device 2 a predetermined number of times with a predetermined rhythm is previously registered as the pre-registered first motion information.

A vibration waveform signal to be registered as the pre-registered second motion information is, for example, a vibration waveform signal resulting from an authentication motion that the user carrying the portable device 2 does not intentionally perform on the portable device 2. In the present case, for example, a vibration waveform signal representing a user's walking motion is previously registered as the pre-registered second motion information.

Further, as with the vibration waveform signal to be registered as the pre-registered second motion information, a vibration waveform signal to be registered as the pre-registered third motion information is, for example, a vibration waveform signal resulting from an authentication motion that the user carrying the portable device 2 does not intentionally perform on the portable device 2. For example, a case is considered where the user carrying the portable device 2 moves so close to the vehicle 10 that it is difficult to detect a walking motion associated with the pre-registered second motion information. For such a case, a vibration waveform signal representing a stepping motion is previously registered as the pre-registered third motion information. This is because a stepping motion is a motion that the user is able to perform regardless of the distance from the vehicle 10.

The waveform verifier 36 verifies, based on pre-registered motion information provided from the waveform memory 35, a vibration waveform signal supplied from the radio receiver 32. That is, the waveform verifier 36 determines, in a case where a vibration waveform signal corresponding to pre-registered motion information read from the waveform memory 35 and a supplied vibration waveform signal coincide with each other within a predetermined tolerance, that the corresponding user's motion matches the pre-registered motion information.

For example, the waveform verifier 36 supplies a verification complete signal to the unlock determiner 37 in response to the following conditions being satisfied: a user's motion matches the pre-registered first motion information; and a user's motion matches either one of the pre-registered second motion information and the pre-registered third motion information. That is, the waveform verifier 36 supplies a verification complete signal to the unlock determiner 37 in response to composite authentication being successful.

The unlock determiner 37 is capable of serving as a composite-authentication processor 38 and a simple-authentication processor 39.

If the composite-authentication processor 38 receives a lock request signal in a case where the portable device 2 is located outside the cabin of the vehicle 10 and outside the lock-object vicinity area AR1, the composite-authentication processor 38 locks the door unit 4 of the vehicle 10. The lock request signal is received at this time from the portable device 2 as a result of, for example, an operation made on the operation unit 25. The composite-authentication processor 38 sets the composite authentication security ON in response to the locking of the door unit 4.

With the composite authentication security set ON, the composite-authentication processor 38 sets, in response to receiving a key-verification complete signal from the key verifier 34 and receiving a verification complete signal from the waveform verifier 36, an unlock permit state in which unlocking of the door unit 4 is permitted.

In the unlock permit state, the composite-authentication processor 38 unlocks the door unit 4 in response to receiving an unlock request signal. The unlock request signal at this time is, for example, received from the door unit 4 in response to a touch on a touch sensor 41 disposed at the door handle. The composite-authentication processor 38 sets the composite authentication security OFF in response to the unlocking of the door unit 4.

If the simple-authentication processor 39 receives a lock request signal in a case where the portable device 2 is located outside the cabin of the vehicle 10 and inside the lock-object vicinity area AR1, the simple-authentication processor 39 locks the door unit 4 of the vehicle 10. At this time, the lock request signal is received from the door unit 4 in response to, for example, a touch on the touch sensor 41 disposed at the door handle. At this time, the simple-authentication processor 39 sets the simple authentication security ON.

With the simple authentication security set ON, during the period of time from when the door unit 4 is locked to when a preset time elapses, or during the period of time from when the door unit 4 is locked to when the portable device 2 is located outside the authentication notification area AR2, the simple-authentication processor 39 sets an unlock permit state in response to receiving a key-verification complete signal from the key verifier 34.

In the unlock permit state, the simple-authentication processor 39 unlocks the door unit 4 in response to receiving an unlock request signal. At this time, the unlock request signal is received from the door unit 4 in response to, for example, a touch on the touch sensor 41 disposed at the door handle. The simple-authentication processor 39 sets the simple authentication security OFF in response to the unlocking of the door unit 4.

In a case where a preset time elapses after the door unit 4 is locked, or if the portable device 2 is located outside the authentication notification area AR2 after the door unit 4 is locked, then the simple-authentication processor 39 sets the simple authentication security OFF and sets the composite authentication security ON.

In a case where the unlock determiner 37 detects an operation signal that is transmitted from the portable device 2 to the onboard device 3 as a result of an unlock operation made on the operation unit 25 of the portable device 2, then the unlock determiner 37 unlocks the door unit 4 in response to supply of a key-verification complete signal, irrespective of whether the current state is an unlock permit state.

As illustrated in FIG. 3, the door unit 4 is disposed at each door of the vehicle 10. The door unit 4 includes the touch sensor 41 and an actuator 42.

The touch sensor 41 is disposed, for example, at such a location as adjacent to the door handle of the vehicle 10 or on the back side of the door handle of the vehicle 10. The touch sensor 41 outputs, when touched by a user or other person, a lock request signal, an unlock request signal, or other signal to the unlock determiner 37.

As illustrated in FIG. 3, the touch sensor 41 can be disposed at every door unit 4 of the vehicle 10. The door unit 4 is to be disposed at, for example, at least the front door on the driver side. The door unit 4 may be disposed at some other doors, such as the front door on the passenger side and the back door. The door unit 4 may be provided with a button instead of the touch sensor 41. In this case, a lock request signal or an unlock request signal is output in response to the user depressing the button.

The actuator 42 is an actuator used to lock and unlock the door unit 4 of the vehicle 10. The actuator 42 locks the door unit 4 in a case where a lock instruction signal is input from the unlock determiner 37 of the onboard device 3, and unlocks the door unit 4 in a case where an unlock instruction signal is input from the unlock determiner 37.

Exemplary processing to be executed by the onboard-device controller 33 according to the embodiment is described below with reference to FIGS. 4 to 6.

Figure 4:
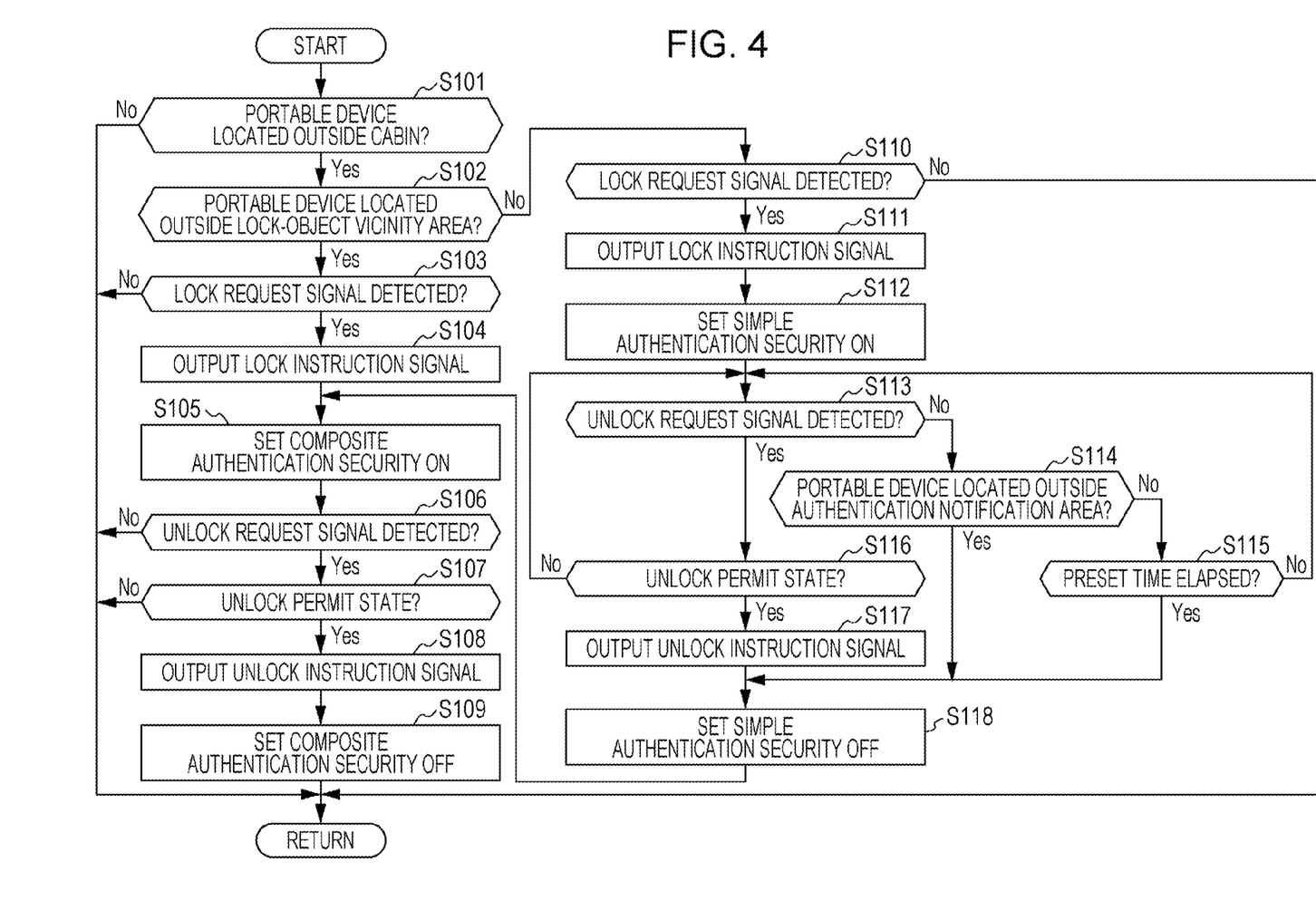
FIG. 4 is a flowchart illustrating exemplary processing to be performed by the electronic key system with respect to locking and unlocking.

Reference is made to FIG. 4 to describe exemplary processing to be executed by the onboard-device controller 33 with respect to locking and unlocking. The onboard-device controller 33 executes the processing illustrated in FIG. 4 at predetermined regular intervals of time.

At step S101, the onboard-device controller 33 determines whether the portable device 2 is located outside the cabin of the vehicle 10. The onboard-device controller 33 determines, based on the condition of radio reception from the portable device 2 by onboard antennas (radio receiver 32), whether the portable device 2 is located outside the cabin (see FIG. 3).

In a case where the onboard-device controller 33 determines at step S101 that the portable device 2 is located inside the cabin, the onboard-device controller 33 ends the processing illustrated in FIG. 4. Although not described in further detail, in this case, processing to be executed by the onboard-device controller 33 with respect to control of locking and unlocking inside the cabin is executed separately.

In a case where the onboard-device controller 33 determines at step S101 that the portable device 2 is located outside the cabin, the onboard-device controller 33 proceeds to step S102, where the onboard-device controller 33 determines whether the portable device 2 is located outside the lock-object vicinity area AR1. At this time, the onboard-device controller 33 determines, based on the condition of radio reception by onboard antennas (radio receiver 32) from the portable device 2 that has received the first modulated signal, whether the portable device 2 is located outside the lock-object vicinity area AR1.

In a case where the onboard-device controller 33 determines at step S102 that the portable device 2 is located outside the lock-object vicinity area AR1, the onboard-device controller 33 proceeds to step S103. At this time, the user carrying the portable device 2 is located outside the lock-object vicinity area AR1. It is thus assumed that the user is located far from the vehicle 10 to such an extent that the user is unable to touch the touch sensor 41 of the door unit 4.

At step S103, the onboard-device controller 33 determines whether a lock request signal has been detected. The lock request signal in this case is, for example, a signal that is transmitted from the portable device 2 to the onboard device 3 when the user located in an area away from the vicinity of the vehicle 10 and thus outside the lock-object vicinity area AR1 performs a lock operation on the operation unit 25 of the portable device 2 that is being carried by the user. The lock request signal may be transmitted from the portable device 2 to the onboard device 3 in a case where the portable device 2 and the onboard device 3 are located out of the communication range of each other, that is, when the portable device 2 has moved out of the authentication notification area AR2.

In a case where the onboard-device controller 33 determines at step S103 that a lock request signal has not been detected, the onboard-device controller 33 ends the processing illustrated in FIG. 4.

In a case where the onboard-device controller 33 determines at step S103 that a lock request signal has been detected, the onboard-device controller 33 proceeds to step S104 to output a lock instruction signal to the actuator 42. The actuator 42 locks the door unit 4 in response to the lock instruction signal being input from the onboard-device controller 33.

At the next step S105, the onboard-device controller 33 sets the composite authentication security ON. With the composite authentication security set ON, the user is allowed to unlock the door unit 4 by completing composite authentication.

At step S106, the onboard-device controller 33 determines whether an unlock request signal has been detected. The unlock request signal in this case is a signal that is output from the touch sensor 41 to the onboard-device controller 33 in response to the user in the vicinity of the vehicle 10 touching the touch sensor 41.

In a case where the onboard-device controller 33 determines at step S106 that an unlock request signal has not been detected, the onboard-device controller 33 ends the processing illustrated in FIG. 4.

In a case where the onboard-device controller 33 determines at step S106 that an unlock request signal has been detected, the onboard-device controller 33 proceeds to step S107, and determines whether the current state is an unlock permit state. At this time, an unlock permit state is entered when, after a key signal matches pre-registered key information, a user's motion matches the pre-registered first motion information, and a user's motion matches either one of the pre-registered second motion information and the pre-registered third motion information. The unlock permit state is described again in detail later with reference to FIG. 5.

In a case where the onboard-device controller 33 determines at step S107 that the current state is not an unlock permit state, the onboard-device controller 33 ends the processing illustrated in FIG. 4. That is, unless composite authentication has been successfully completed, the door unit 4 is not unlocked even in a case where the onboard-device controller 33 determines at step S106 that an unlock request signal has been detected.

In a case where the onboard-device controller 33 determines at step S107 that the current state is an unlock permit state, the onboard-device controller 33 proceeds to step S108 to output an unlock instruction signal to the actuator 42. The actuator 42 unlocks the door unit 4 in response to the unlock instruction signal being input from the onboard-device controller 33.

Then, at step S109, the onboard-device controller 33 sets the composite authentication security OFF, and ends the processing illustrated in FIG. 4. Through steps S105 to S109 mentioned above, processing related to unlocking of the door unit 4 performed with the composite authentication security ON is completed.

In a case where the onboard-device controller 33 determines at step S102 above that the portable device 2 is located inside the lock-object vicinity area AR1, the onboard-device controller 33 proceeds to step S110. At this time, the user is assumed to be in the vicinity of the vehicle 10.

At step S110, the onboard-device controller 33 determines whether a lock request signal has been detected. The lock request signal in this case is, for example, a signal that is output from the touch sensor 41 to the onboard-device controller 33 in response to the user inside the lock-object vicinity area AR1 touching the touch sensor 41. The lock request signal may be a signal that is transmitted from the portable device 2 to the onboard device 3 when the user performs a lock operation on the operation unit 25 of the portable device 2 that is being carried by the user.

In a case where the onboard-device controller 33 determines at step S110 that a lock request signal has not been received, the onboard-device controller 33 ends the processing illustrated in FIG. 4.

In a case where the onboard-device controller 33 determines at step S110 that a lock request signal has been detected, the onboard-device controller 33 proceeds to step S111 to input a lock instruction signal to the actuator 42. The actuator 42 locks the door unit 4 in response to the lock instruction signal being input from the onboard-device controller 33.

At the next step S112, the onboard-device controller 33 sets the simple authentication security ON. When the simple authentication security is ON, unlocking of the door is permitted without the user performing composite authentication.

Then, the onboard-device controller 33 performs a monitoring loop process with respect to steps S113, S114, and S115.

At step S113 of the monitoring loop process, the onboard-device controller 33 determines whether an unlock request signal has been detected.

In a case where the onboard-device controller 33 determines at step S113 that an unlock request signal has been detected, the onboard-device controller 33 proceeds to step S116 to determine whether the current state is an unlock permit state. At this time, an unlock permit state is entered in response to a key signal matching pre-registered key information. As described above, when the user is located in the vicinity of the vehicle 10, it is assumed that the user will attempt to unlock the door unit 4 again. Making composite authentication unnecessary in such a case may allow the user to easily unlock the door unit 4.

In a case where the onboard-device controller 33 determines at step S116 that the current state is not an unlock permit state, the onboard-device controller 33 proceeds to step S113 to return to the monitoring loop process.

In a case where the onboard-device controller 33 determines at step S116 that the current state is an unlock permit state, the onboard-device controller 33 proceeds to step S117 to output an unlock instruction signal to the actuator 42. The actuator 42 unlocks the door unit 4 in response to the unlock instruction signal being input from the onboard-device controller 33.

Then, at step S118, the onboard-device controller 33 sets the simple authentication security OFF, and executes the processing from steps S105 to S109, which is processing related to unlocking of the door unit 4 performed with the composite authentication security ON.

At step S114 of the monitoring loop process, the onboard-device controller 33 determines whether the portable device 2 is located outside the authentication notification area AR2. That is, the onboard-device controller 33 determines whether the user has moved sufficiently far from the vehicle 10. For example, the onboard-device controller 33 determines, in response to an RF signal ceasing to be received at regular intervals from the portable device 2, that the portable device 2 is located outside the authentication notification area AR2.

In a case where the onboard-device controller 33 determines at step S114 that the portable device 2 is located outside the authentication notification area AR2, the onboard-device controller 33 sets the simple authentication security OFF at step S118, and executes the processing from steps S105 to S109, which is processing related to unlocking of the door unit 4 performed with the composite authentication security ON. That is, in a case where the user has moved sufficiently far from the vehicle 10, it is less likely that the user is to immediately unlock the door unit 4. Accordingly, the composite authentication security, which involves composite authentication with enhanced security, is set ON.

At step S115 of the monitoring loop process, the onboard-device controller 33 determines whether a preset time has elapsed since the locking of the door unit 4.

In a case where the onboard-device controller 33 determines at step S115 that a preset time has elapsed since the locking of the door unit 4, the onboard-device controller 33 sets the simple authentication security OFF at step S118, and executes the processing from steps S105 to S109, which is processing related to unlocking of the door unit 4 performed with the composite authentication security ON. In this way, the simple authentication security is set ON until a predetermined time elapses after the door unit 4 is locked. This may allow the user to smoothly unlock the door unit 4 even in a case where the user tries to unlock the door unit 4 immediately after locking the door unit 4.

Figure 5:
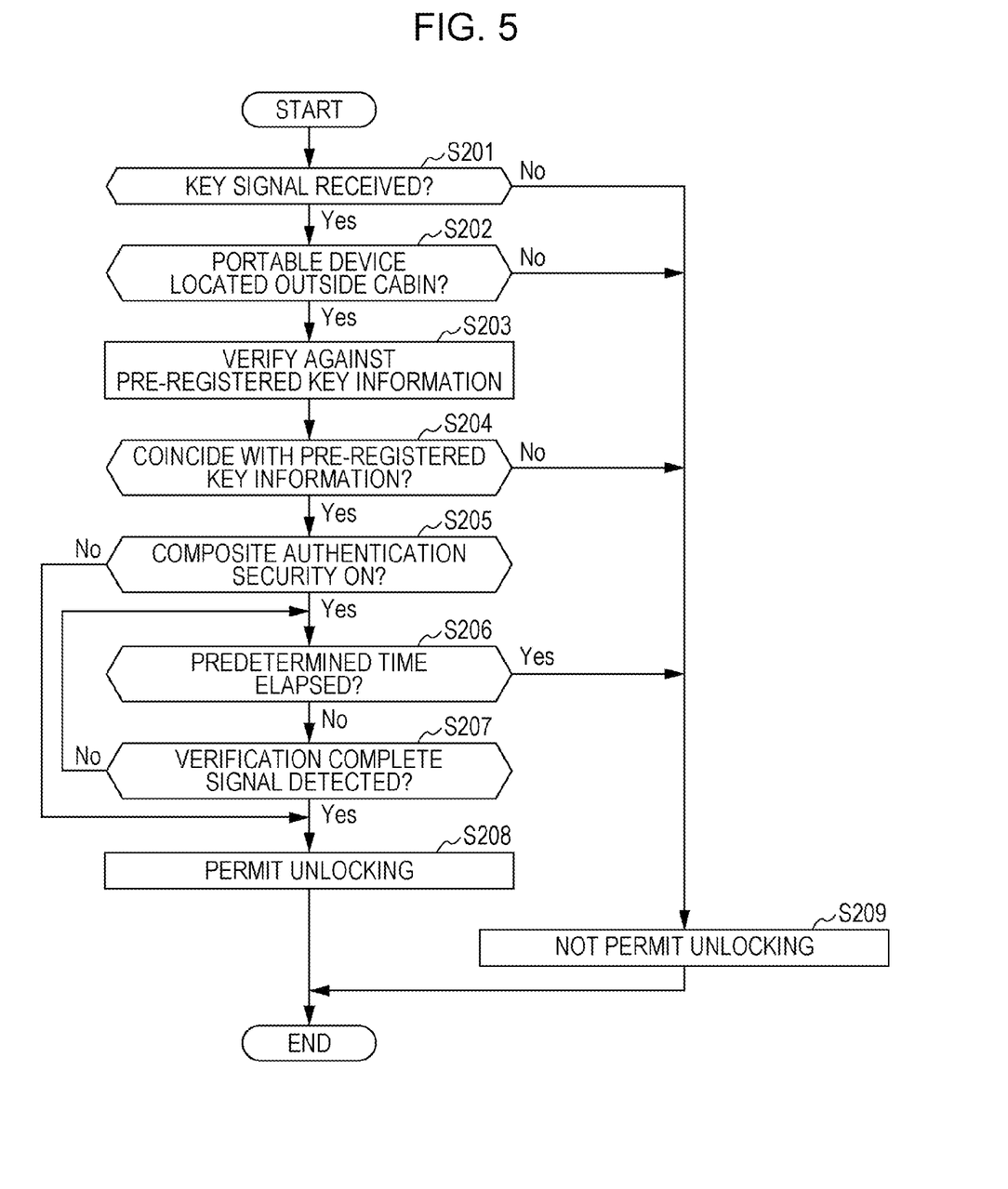
FIG. 5 is a flowchart illustrating exemplary processing to be performed by the electronic key system with respect to permission of unlocking.

Reference is made to FIG. 5 to describe exemplary processing to be executed by the onboard-device controller 33 with respect to permission of unlocking. The onboard-device controller 33 executes, for example, the processing illustrated in FIG. 5 at predetermined regular intervals of time.

At step S201, the onboard-device controller 33 determines whether a key signal has been received from the portable device 2.

In a case where the onboard-device controller 33 determines at step S201 that a key signal has not been received from the portable device 2, the onboard-device controller 33 proceeds to step S209. At step S209, the onboard-device controller 33 sets an unlock non-permit state that does not permit unlocking of the door unit 4, and then ends the processing illustrated in FIG. 5.

In a case where the onboard-device controller 33 determines at step S201 that a key signal has been received from the portable device 2, the onboard-device controller 33 proceeds to step S202 to determine whether the portable device 2 is located outside the cabin of the vehicle 10. The onboard-device controller 33 determines, based on the condition of radio reception from the portable device 2 by onboard antennas (not illustrated) (radio receiver 32), whether the portable device 2 is located outside the cabin.

In a case where the onboard-device controller 33 determines at step S202 that the portable device 2 is located inside the cabin, the onboard-device controller 33 proceeds to step S209 to set an unlock non-permit state, and then ends the processing illustrated in FIG. 5.

In a case where the onboard-device controller 33 determines at step S202 that the portable device 2 is located outside the cabin, the onboard-device controller 33 proceeds to step S203 to perform verification against pre-registered key information. The onboard-device controller 33 verifies the key signal received from the portable device 2 against pre-registered key information previously registered in the onboard device 3. This may make it possible to determine, based on the key signal received from the portable device 2, whether the portable device 2 is a portable device associated with the onboard device 3.

At the next step S204, the onboard-device controller 33 determines, based on the verification result, whether the key signal coincides with pre-registered key information.

In a case where the onboard-device controller 33 determines at step S204 that the key signal does not coincide with the pre-registered key information, the onboard-device controller 33 proceeds to step S209 to set an unlock non-permit state, and then ends the processing illustrated in FIG. 5. That is, since the portable device 2 that has transmitted the key signal is not a portable device associated with the onboard device 3, unlocking of the door unit 4 is not permitted.

In a case where the onboard-device controller 33 determines at step S204 that the key signal and pre-registered key information coincide with each other, the onboard-device controller 33 proceeds to step S205 to determine whether the composite authentication security is ON. That is, the onboard-device controller 33 determines whether composite authentication is to be performed to unlock the door unit 4.

In a case where the onboard-device controller 33 determines at step S205 that the composite authentication security is ON, the onboard-device controller 33 transfers to a monitoring loop process at steps S206 and S207. The onboard-device controller 33 determines at step S206 whether a predetermined period of time has elapsed since completion of the verification against pre-registered key information. The onboard-device controller 33 determines at step S207 whether a verification complete signal has been detected. The verification complete signal is described in detail again later with reference to FIG. 6.

In a case where a predetermined period of time has elapsed prior to detection of a verification complete signal at step S207, the onboard-device controller 33 proceeds from step S206 to step S209. At step S209, the onboard-device controller 33 sets an unlock non-permit state, and then ends the processing illustrated in FIG. 5. As described above, in a case where, when composite authentication is to be performed to unlock the door unit 4, the authentication process is not completed before a predetermined time elapses after verification against pre-registered key information is complete, then unlocking of the door unit 4 is not permitted. Conceivable reasons why the authentication process is not completed include cases such as where the user has not performed a preset authentication motion or when a third person who is not the user has performed an authentication motion. Setting a timeout period for accepting composite authentication in this way may make it possible to prevent unlock permission from being activated erroneously by a motion not intended by the user.

In a case where the onboard-device controller 33 determines at step S207 that a verification complete signal has been detected before the elapse of a predetermined time, the onboard-device controller 33 sets, at step S208, an unlock permit state in which unlocking of the door unit 4 is allowed, and then ends the processing illustrated in FIG. 5. In this way, when the composite authentication security is ON, successfully completing composite authentication enables unlocking of the door unit 4.

In a case where the onboard-device controller 33 determines at step S205 that the composite authentication security is not ON, the onboard-device controller 33 proceeds, without performing steps S206 and S207, to step S208 to set an unlock permit state in which unlocking of the door unit 4 is allowed, and then ends the processing illustrated in FIG. 5. In this way, when the composite authentication security is not ON, composite authentication is not imposed, and thus unlocking of the door unit 4 is allowed simply if a key signal coincides with pre-registered key information.

Figure 6:
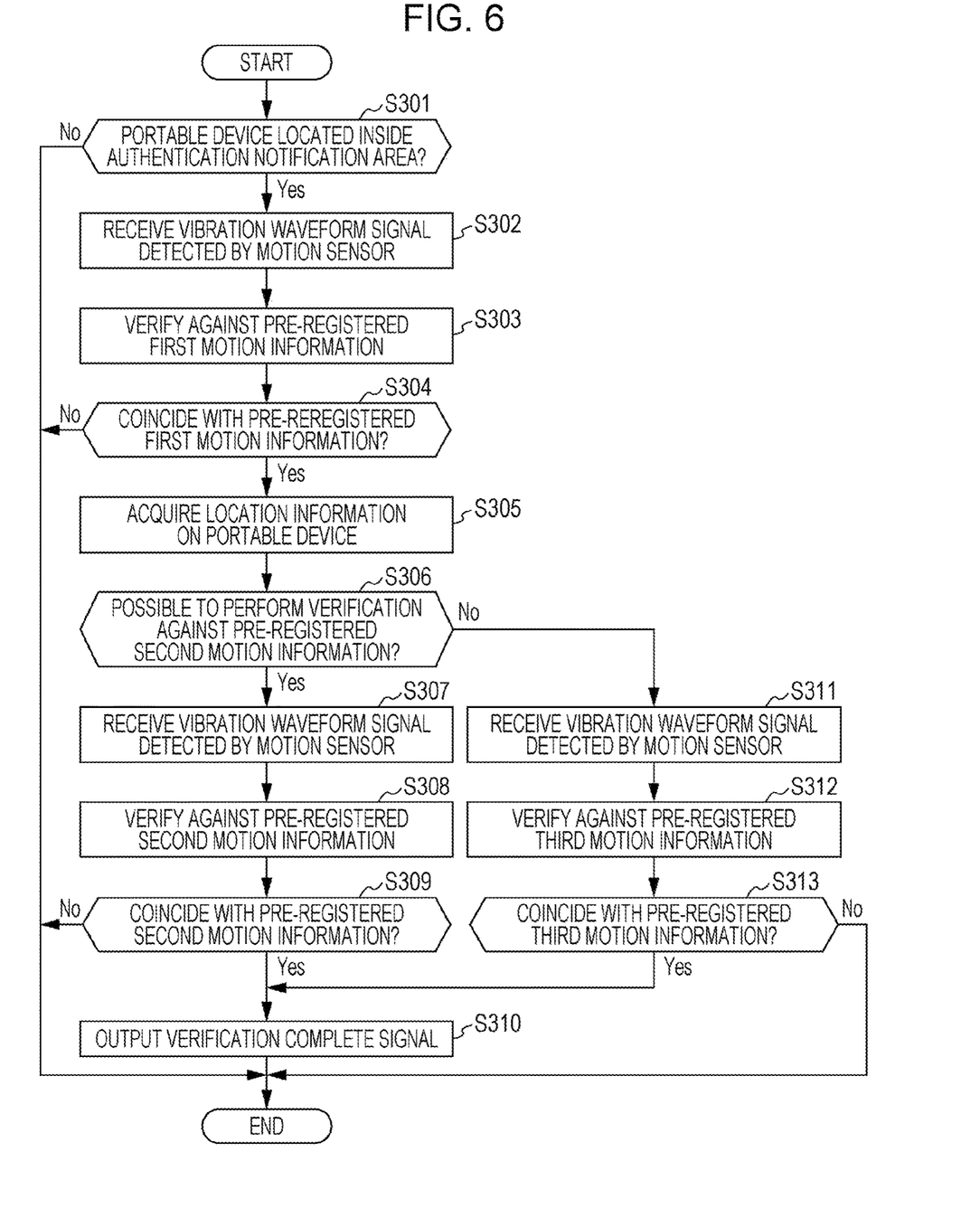
FIG. 6 is a flowchart illustrating exemplary processing to be performed by the electronic key system with respect to a composite authentication process.

Reference is made to FIG. 6 to describe exemplary processing to be executed by the onboard-device controller 33 with respect to composite authentication. The onboard-device controller 33 executes, for example, the processing illustrated in FIG. 6 at predetermined regular intervals of time.

At step S301, the onboard-device controller 33 determines whether the portable device 2 is located inside the authentication notification area AR2. That is, the onboard-device controller 33 determines whether it is possible to receive, from the portable device 2, a vibration waveform signal detected by the motion sensor 22. For example, the onboard-device controller 33 determines, in response to an RF signal being received at regular intervals from the portable device 2, that the portable device 2 is located inside the authentication notification area AR2.

In a case where the onboard-device controller 33 determines at step S301 that the portable device 2 is located outside the authentication notification area AR2, it may not be possible to receive, from the portable device 2, a vibration waveform signal used for composite authentication. Accordingly, the onboard-device controller 33 ends the processing illustrated in FIG. 6.

In a case where the onboard-device controller 33 determines at S301 that the portable device 2 is located inside the authentication notification area AR2, the onboard-device controller 33 proceeds to step S302 to receive, from the portable device 2, a vibration waveform signal detected by the motion sensor 22.

At step S303, the onboard-device controller 33 performs verification against the pre-registered first motion information. At this time, the onboard-device controller 33 determines whether the vibration waveform signal received from the portable device 2, and a vibration waveform signal represented by the pre-registered first motion information previously registered in the onboard device 3 coincide with each other within a predetermined tolerance.

The pre-registered first motion information is, for example, a vibration waveform signal representing a user's motion of tapping the portable device 2 a predetermined number of times with a predetermined rhythm.

In a case where the onboard-device controller 33 determines at the next step S304 that the vibration waveform signal received from the portable device 2 does not coincide with the pre-registered first motion information, the onboard-device controller 33 determines that the corresponding user's motion does not match the pre-registered first motion information, and ends the processing illustrated in FIG. 6. That is, composite authentication fails.

In a case where the onboard-device controller 33 determines at step S304 that the vibration waveform signal received from the portable device 2 coincides with the pre-registered first motion information, the onboard-device controller 33 determines that the corresponding user's motion matches the pre-registered first motion information, and proceeds to step S305.

At step S305, the onboard-device controller 33 acquires location information on the portable device 2. For example, the onboard-device controller 33 determines, based on the condition of radio reception from the portable device 2 by onboard antennas (not illustrated) (radio receiver 32) that has received the first modulated signal, whether the portable device 2 is located inside the lock-object vicinity area AR1.

At step S306, the onboard-device controller 33 determines whether the portable device 2 is located at a position where it is possible to detect a vibration waveform signal used for verification against the pre-registered second motion information. The pre-registered second motion information is, for example, a vibration waveform signal representing a directional motion in which the user carrying the portable device 2 walks toward the vehicle 10. In this case, if the user and the vehicle 10 are too close to each other, it may sometimes be difficult to sufficiently detect a vibration waveform signal representing a user's walking motion and used for verification against the pre-registered second motion information. Accordingly, the onboard-device controller 33 determines whether the portable device 2 being carried by the user, and the vehicle 10 are located at a sufficient distance from each other.

For example, the onboard-device controller 33 determines, if the portable device 2 is located outside the lock-object vicinity area AR1, that the portable device 2 is at a position that allows detection of a vibration waveform signal used for verification against the pre-registered second motion information.

In this case, the onboard-device controller 33 receives, at step S307, a vibration waveform signal detected by the motion sensor 22. At step S308, the onboard-device controller 33 verifies the vibration waveform signal against the pre-registered second motion information. At this time, the onboard-device controller 33 determines whether the vibration waveform signal received from the portable device 2, and a vibration waveform signal represented by the pre-registered second motion information previously registered in the onboard device 3 coincide with each other within a predetermined tolerance.

In a case where the onboard-device controller 33 determines at the next step S309 that the vibration waveform signal received from the portable device 2 does not coincide with the pre-registered second motion information, the onboard-device controller 33 determines that the corresponding user's authentication motion does not match the pre-registered second motion information, and ends the processing illustrated in FIG. 6. That is, composite authentication fails.

In a case where the onboard-device controller 33 determines at step S309 that the vibration waveform signal received from the portable device 2 coincides with the pre-registered second motion information, the onboard-device controller 33 determines that the corresponding user's authentication motion matches the pre-registered second motion information. The onboard-device controller 33 then outputs a verification complete signal at step S310, and ends the processing illustrated in FIG. 6. Composite authentication is successfully completed.

In a case where the onboard-device controller 33 determines at step S306 that the portable device 2 is not located at a position that allows detection of a vibration waveform signal used for verification against the pre-registered second motion information, the onboard-device controller 33 proceeds to step S311. In this case, the vibration waveform signal received from the portable device 2 is verified against the pre-registered third motion information instead of against the pre-registered second motion information.

An example of the pre-registered third motion information is a vibration waveform signal representing a stepping motion for which the corresponding vibration waveform signal to be used for verification can be detected even if a sufficient walking distance is not available. Consequently, even in a situation where it is difficult to perform verification by use of the pre-registered second motion information, the pre-registered third motion information can be used instead to perform composite authentication.

At step S311, the onboard-device controller 33 receives a vibration waveform signal detected by the motion sensor 22. At step S312, the onboard-device controller 33 verifies the vibration waveform signal against the pre-registered third motion information. At this time, the onboard-device controller 33 determines whether the vibration waveform signal received from the portable device 2, and a vibration waveform signal represented by the pre-registered third motion information previously registered in the onboard device 3 coincide with each other within a predetermined tolerance.

In a case where the onboard-device controller 33 determines at the next step S313 that the vibration waveform signal received from the portable device 2 does not coincide with the pre-registered third motion information, the onboard-device controller 33 determines that the corresponding user's authentication motion does not match the pre-registered third motion information, and ends the processing illustrated in FIG. 6. That is, composite authentication fails.

In a case where the onboard-device controller 33 determines at step S313 that the vibration waveform signal received from the portable device 2 coincides with the pre-registered third motion information, the onboard-device controller 33 determines that the corresponding user's motion matches the pre-registered third motion information. The onboard-device controller 33 then outputs a verification complete signal at step S310, and ends the processing illustrated in FIG. 6. Composite authentication is successfully completed.

Exemplary processing to be executed by the portable-device controller 24 according to the embodiment is described below with reference to FIG. 7. The portable-device controller 24 executes the processing illustrated in FIG. 7 at predetermined regular intervals of time.

At step S401, the portable-device controller 24 determines whether the portable device 2 has moved from the outside of the authentication notification area AR2 to the inside of the authentication notification area AR2.

For example, in a case where the second modulated signal is received again after elapse of a predetermined period of time from when the second modulated signal has ceased to be received from the onboard device 3, the portable-device controller 24 determines that the portable device 2 has moved from the outside of the authentication notification area AR2 to the inside of the authentication notification area AR2. This may make it possible to determine that the user carrying the portable device 2 has entered the authentication notification area AR2.

Alternatively, the portable-device controller 24 may be also configured to, by use of a global navigation satellite system (GNSS) such as a global positioning system (GPS), determine entry of the portable device 2 into the authentication notification area AR2 from changes in the location of the portable device 2.

In a case where the portable-device controller 24 determines at step S401 that the portable device 2 has moved from the outside of the authentication notification area AR2 to the inside of the authentication notification area AR2, the portable-device controller 24 proceeds to step S409 to execute a notification control process. At this time, the portable-device controller 24 causes the notifier 23 to output notification information. For example, by causing a vibrator of the notifier 23 to vibrate, or by causing a notification sound to be output via a speaker of the notifier 23, the portable-device controller 24 allows the user to recognize that the portable device 2 is located inside the authentication notification area AR2, in other words, that the user is able to perform composite authentication.

In a case where the portable-device controller 24 determines at step S401 that the portable device 2 has not moved from the outside of the authentication notification area AR2 to the inside of the authentication notification area AR2, the portable-device controller 24 proceeds to step S410. At this time, the portable device 2 is located in either one of the following locations: outside the authentication notification area AR2; and inside the authentication notification area AR2.

At step S410, the portable-device controller 24 determines whether the portable device 2 is located inside the authentication notification area AR2. At this time, for example, the portable-device controller 24 determines, in response to the second modulated signal being received at regular intervals from the onboard device 3, that the portable device 2 is located inside the authentication notification area AR2. The portable-device controller 24 can be also configured to determine, by acquiring location information on the portable device 2 via the GPS, whether the portable device 2 is located inside the authentication notification area AR2.

Figure 7:
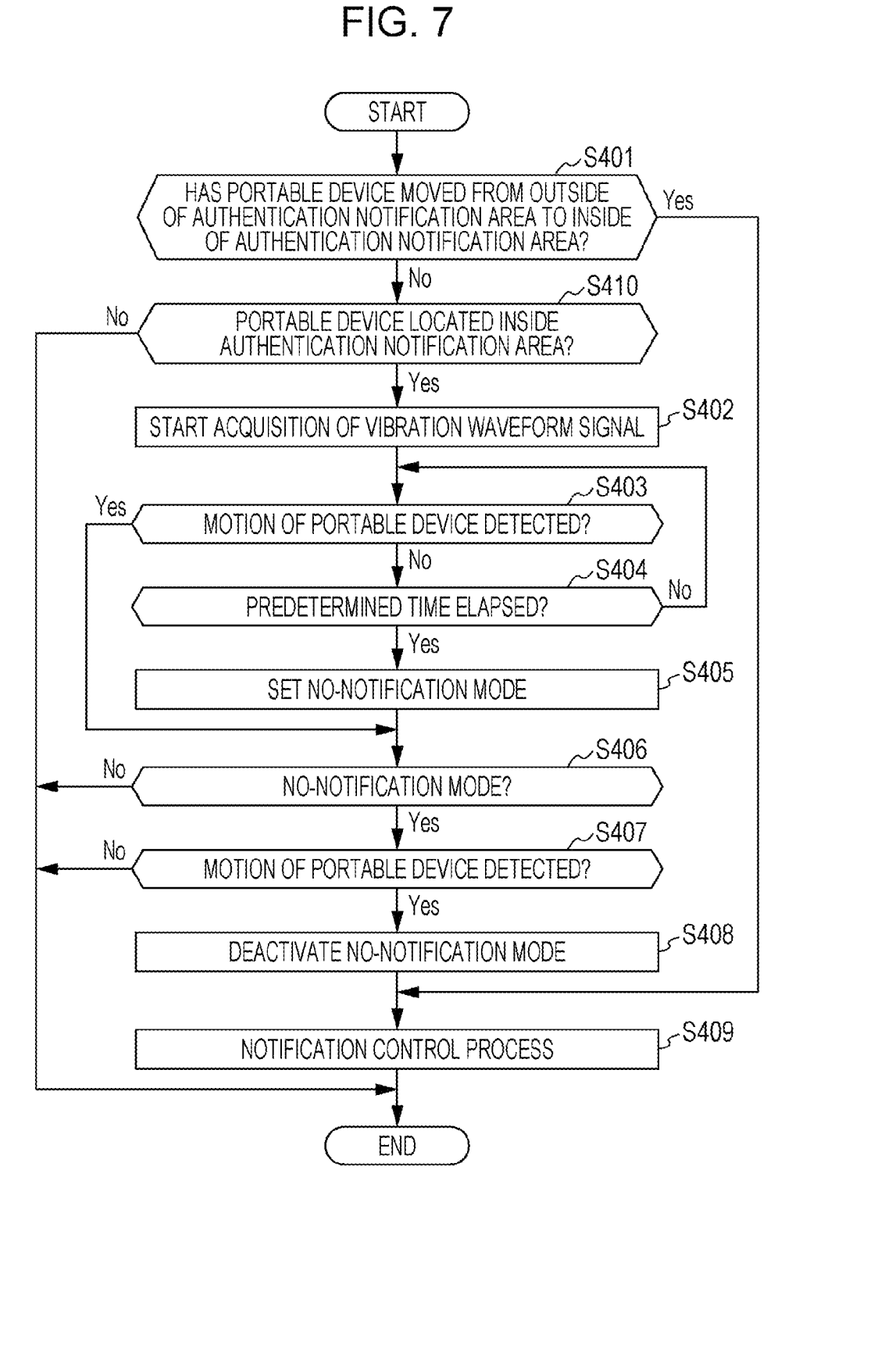
FIG. 7 is a flowchart illustrating exemplary processing to be performed by the electronic key system with respect to a notification control process.

In a case where the portable-device controller 24 determines at step S410 that the portable device 2 is not located inside the authentication notification area AR2, the portable-device controller 24 ends the processing illustrated in FIG. 7.

In a case where the portable-device controller 24 determines at step S410 that the portable device 2 is located inside the authentication notification area AR2, the portable-device controller 24 proceeds to step S402. This represents a state in which, for example, the user carrying the portable device 2 has not yet moved out of the authentication notification area AR2 after getting out of the vehicle 10.

At step S402, the portable-device controller 24 starts acquisition of a vibration waveform signal detected by the motion sensor 22. At step S403, the portable-device controller 24 detects motion of the portable device 2 based on the acquired vibration waveform signal.

In a case where motion of the portable device 2 has been detected at step S403, the portable-device controller 24 proceeds to step S406. At this time, a no-notification mode has not been set, and thus the portable-device controller 24 ends the processing illustrated in FIG. 7. In this way, as long as the portable device 2 continues to be located inside the authentication notification area AR2, no vibration, sound, or other notification is output from the notifier 23 even if motion of the portable device 2 is detected. This may make it possible to prevent the user from receiving notifications from the notifier 23 again and again while being present inside the authentication notification area AR2.

In a case where motion of the portable device 2 has not been detected at step S403, the portable-device controller 24 proceeds to step S404, and waits until a predetermined time elapses after motion of the portable device 2 ceases to be detected. In a case where motion of the portable device 2 has been detected at step S403 prior to elapse of a predetermined time, the portable-device controller 24 proceeds to step S406, and ends the processing illustrated in FIG. 7.

If, at step S404, a predetermined time elapses after motion of the portable device 2 ceases to be detected, the portable-device controller 24 proceeds to step S405 to set a no-notification mode. An example of a conceivable situation where motion of the portable device 2 is not detected for a long time is when the user is not carrying the portable device 2, such as when the user has temporarily left the portable device 2 somewhere.

At step S403, the portable-device controller 24 proceeds through steps S406 and S407 in this order, and detects motion of the portable device 2 based on the acquired vibration waveform signal.

In a case where motion of the portable device 2 has not been detected at step S407, the portable-device controller 24 ends the processing illustrated in FIG. 7 without performing a notification control for the notifier 23. As a result, in cases such as where the user temporarily leaves the portable device 2 somewhere, no notification is output from the notifier 23. This may make it possible to prevent the user from receiving notification from the notifier 23 even in situations where it is assumed that the user is not carrying the portable device 2 and that the user has no intention of getting back to the vehicle 10.

In a case where motion of the portable device 2 has been detected at step S407, the portable-device controller 24 deactivates the no-notification mode at step S408. In this case, it can be assumed that the user is getting back to the vehicle 10 after performing a motion such as picking up the portable device 2 that has been left somewhere.

At the next step S409, the portable-device controller 24 executes a notification control process for the notifier 23. The portable-device controller 24 then ends the processing illustrated in FIG. 7. The portable-device controller 24 outputs a notification control signal to the notifier 23 to thereby cause the notifier 23 to generate a vibration or sound via a vibrator, a speaker, or other component. As a result, the user may be allowed to, when carrying the portable device 2 on the user again and trying to get back to the vehicle 10, recognize that the user is located inside the authentication notification area AR2, in other words, that the user is located at a position where composite authentication can be performed.

The electronic key system 1 according to the embodiment described above includes the door unit 4, the onboard device 3, the portable device 2, one or more processors, and a memory. The door unit 4 is disposed in the vehicle 10. The onboard device 3 is disposed in the vehicle 10. The portable device 2 is capable of communicating with the onboard device 3 in the authentication notification area AR2, and capable of being carried by the user. The memory is configured to store a program that is to be executed by the one or more processors (see FIGS. 1 and 2).

The program includes one or more instructions. The one or more instructions cause the one or more processors to execute a composite authentication process. The composite authentication process permits the door unit 4 to be unlocked provided that all of a plurality of conditions are satisfied. The plurality of conditions include that: key information output from the portable device 2 matches pre-registered key information; a motion performed by a user on the portable device 2 matches the pre-registered first motion information; and the motion matches the pre-registered second motion information (see FIGS. 4 and 5).

Accordingly, unlocking is normally permitted subject to a plurality of authentication processes including, in addition to matching against the pre-registered key information, matching against the pre-registered first motion information, and matching against the pre-registered second motion information. In this way, unlocking is permitted subject to a plurality of authentication processes that authenticate the user provided that a user's specific motion is detected. This may make it possible to, for example, prevent an attack such as a so-called relay attack. A relay attack is an attack in which an attacker waits until the user is away from the vehicle 10, and when such an opportune moment arises, the attacker uses a relay device to establish communication between the onboard device 3 disposed in the vehicle and a portable device that is out of the communication range of the onboard device 3 to thereby perform unauthorized unlocking or other unwanted attacks. The above-mentioned configuration may make it possible to provide sufficient security for the electronic key system 1.

The one or more instructions cause the one or more processors to execute a simple authentication process during the period of time from when the door unit 4 is locked to when a preset time elapses, or during the period of time from when the door unit 4 is locked to when the portable device 2 is located outside the authentication notification area AR2. The simple authentication process permits the door unit 4 to be unlocked provided that the key information matches the pre-registered key information (see FIGS. 4 and 5).

As described above, in situations where the user is assumed to have not moved very far from the vehicle 10, such as during the period of time from when the door unit 4 is locked to when a preset time elapses, or during the period of time from when the door unit 4 is locked to when the portable device 2 is located outside the authentication notification area AR2, the risk of unauthorized unlocking or other unwanted attacks being performed by a third person is relatively low. Accordingly, in such situations, permission to unlock is not subject to a composite authentication process including matching against the pre-registered first motion information and matching against the pre-registered second motion information.

As a result, for example, in cases such as where the user has returned to the vehicle 10 after forgetting something in the vehicle, the user is allowed to unlock via a simple authentication process that does not involve composite authentication of the user, such as a simple authentication process based on the user's touching on the door handle (touch sensor 41). This configuration allows for enhanced convenience for the user of the electronic key system 1 in situations where there is relatively low risk of unauthorized unlocking or other unwanted attacks.

The one or more instructions included in the program stored in the memory of the electronic key system 1 according to the embodiment cause the one or more processors to execute the simple authentication process in a case where the door unit 4 of the vehicle 10 is locked when the portable device 2 is located inside the lock-object vicinity area AR1, which is a part of the authentication notification area AR2 (see FIGS. 4 and 5).

When the portable device 2 is located inside the lock-object vicinity area AR1, the user is assumed to be in the vicinity of the vehicle 10. As described above, in situations where the user is very likely to unlock the vehicle 10 again, such as when the user is in the vicinity of the vehicle 10, the user is allowed to unlock via the simple authentication process. This may lead to enhanced user convenience.

The one or more instructions included in the program stored in the memory of the electronic key system 1 according to the embodiment cause the one or more processors to, in a case where no motion of the portable device 2 located inside the authentication notification area AR2 has been detected for a predetermined time, execute a mode switching process that causes the portable device 2 to be switched to a no-notification mode in which the portable device 2 does not output notification information (see FIG. 7).

As a result, for example, in situations where the user is assumed to have no intention of unlocking the vehicle 10, such as when the user has temporarily left the portable device 2 at the entrance hall of the user's home or other place, no notification of the presence of the portable device 2 inside the authentication notification area AR2 is output from the portable device 2.

This may make it possible to save the user the trouble of receiving unintended notifications output again and again from the portable device 2, and consequently enhance the convenience of the user who remains to be present inside the authentication notification area AR2.

The one or more instructions included in the program stored in the memory of the electronic key system 1 according to the embodiment cause the one or more processors to, in a case where motion of the portable device 2 is detected during the no-notification mode, execute, as the mode switching process, a process that deactivates the no-notification mode (see FIG. 7).

In a case where motion of the portable device 2 is detected again as described above, it is assumed, for example, that the user will carry, on the user again, the portable device 2 that the user has previously left somewhere, and head toward the vehicle 10. In such a case, the user is notified that the portable device 2 is located inside the authentication notification area AR2, in other words, that it is possible for the user to perform composite authentication for unlocking. This allows the user to smoothly transition to performing a motion used for unlocking. This allows for enhanced convenience for the user who remains to be present inside the authentication notification area AR2.

In a case where the portable device 2 features GPS capability, the one or more processors can be caused to, in response to detection of movement of the portable device 2 toward the vehicle 10, execute the process that deactivates the no-notification mode.

The one or more instructions included in the program stored in the memory of the electronic key system 1 according to the embodiment cause the one or more processors to execute, as the composite authentication process, a process that permits the door unit 4 to be unlocked provided that two of a plurality of conditions are satisfied. The plurality of conditions include that: the motion matches the pre-registered first motion information; the motion matches the pre-registered second motion information; and the motion matches the pre-registered third motion information (see FIGS. 4 and 5).

As a result, even in the presence of a constraint that the user is unable to perform a motion corresponding to either one of the pre-registered first motion information and the pre-registered second motion information, matching with the pre-registered third motion information may be used instead as a condition for unlocking the door unit 4.

For instance, a case is considered where a motion corresponding to the pre-registered second motion information is walking, and a motion corresponding to the pre-registered third motion information is stepping. In this case, if the user is too close to the vehicle 10 to allow detection of the user's walking, that is, in a situation where it is difficult to detect a vibration waveform signal corresponding to the pre-registered second motion information, the condition for unlocking can be satisfied provided that the stepping motion matches the pre-registered third motion information.

This may make it possible to use different authentication methods flexibly based on the user's situation while maintaining the condition that composite authentication is to be performed. This may make it possible to enhance user convenience, and also provide sufficient security.

In the electronic key system 1 according to the embodiment, the function of the waveform memory 35 and the function of the waveform verifier 36 may be provided with the portable-device controller 24 instead of the onboard-device controller 33. In this case, the portable-device controller 24 executes the processing illustrated in FIG. 6, and transmits, to the onboard device 3 via the radio transmitter 26, the verification complete signal output at step S310. The onboard-device controller 33 executes the processing illustrated in FIG. 5 based on the verification complete signal received from the portable device 2.

The effects disclosed herein are intended to be illustrative and not restrictive. That is, other effects may be provided, or some of the effects disclosed herein may be provided. The above embodiment is representative of one exemplary embodiment and not intended to be limiting of the disclosure. It is evident that various modifications may be made in accordance with the design being contemplated or other features without departing from the technical idea or scope of the disclosure. Not all of the combinations of features described with reference to the above embodiment may necessarily be used to address the problems that are to be addressed by the disclosure.

The invention claimed is:

1. An electronic key system comprising:
a door unit to be disposed in a lock object;
an installed device to be disposed in the lock object;
a portable device configured to communicate with the installed device in an authentication notification area and configured to be carried by a user,
one or more processors; and a storage medium storing a program that is to be executed by the one or more processors,
wherein the program comprises one or more instructions,
wherein the one or more instructions cause the one or more processors to
execute a composite authentication process, the composite authentication process permitting the door unit to be unlocked provided that all of conditions are satisfied, the conditions including
that key information output from the portable device matches pre-registered key information,
that a motion performed by the user matches pre-registered first motion information, and
that the motion matches pre-registered second motion information, and
execute a simple authentication process during a period of time from when the door unit is locked to when a preset time elapses, or during a period of time from when the door unit is locked to when the portable device is located outside the authentication notification area, the simple authentication process permitting the door unit to be unlocked provided that a condition is satisfied, the condition consisting of that the key information matches the pre-registered key information.

2. The electronic key system according to claim 1,
wherein the one or more instructions cause the one or more processors to,
in a case where the lock object is locked when the portable device is located inside a lock-object vicinity area, execute the simple authentication process, the lock-object vicinity area being a part of the authentication notification area.

3. The electronic key system according to claim 2,
wherein the one or more processors are configured to, in a case where the portable device is located inside the authentication notification area, cause the portable device to output notification information, and
wherein the one or more instructions cause the one or more processors to,
in a case where no motion of the portable device located inside the authentication notification area has been detected for a predetermined time, execute a mode switching process that causes the portable device to be switched to a no-notification mode in which the portable device does not output the notification information.

4. The electronic key system according to claim 3,
wherein the one or more instructions cause the one or more processors to,
in a case where motion of the portable device is detected during the no-notification mode, execute, as the mode switching process, a process that deactivates the no-notification mode.

5. The electronic key system according to claim 4,
wherein the one or more instructions cause the one or more processors to
execute, as the composite authentication process, a process that permits the door unit to be unlocked provided that two of conditions are satisfied, the conditions including
that the motion performed by the user matches the pre-registered first motion information,
that the motion performed by the user matches the pre-registered second motion information, and
that the motion performed by the user matches pre-registered third motion information.

6. The electronic key system according to claim 3,
wherein the one or more instructions cause the one or more processors to
execute, as the composite authentication process, a process that permits the door unit to be unlocked provided that two of conditions are satisfied, the conditions including
that the motion performed by the user matches the pre-registered first motion information,
that the motion performed by the user matches the pre-registered second motion information, and
that the motion performed by the user matches pre-registered third motion information.

7. The electronic key system according to claim 2,
wherein the one or more instructions cause the one or more processors to
execute, as the composite authentication process, a process that permits the door unit to be unlocked provided that two of conditions are satisfied, the conditions including
that the motion performed by the user matches the pre-registered first motion information,
that the motion performed by the user matches the pre-registered second motion information, and
that the motion performed by the user matches pre-registered third motion information.

8. The electronic key system according to claim 1,
wherein the one or more processors are configured to, in a case where the portable device is located inside the authentication notification area, cause the portable device to output notification information, and
wherein the one or more instructions cause the one or more processors to,
in a case where no motion of the portable device located inside the authentication notification area has been detected for a predetermined time, execute a mode switching process that causes the portable device to be switched to a no-notification mode in which the portable device does not output the notification information.

9. The electronic key system according to claim 8,
wherein the one or more instructions cause the one or more processors to,
in a case where motion of the portable device is detected during the no-notification mode, execute, as the mode switching process, a process that deactivates the no-notification mode.

10. The electronic key system according to claim 9,
wherein the one or more instructions cause the one or more processors to
execute, as the composite authentication process, a process that permits the door unit to be unlocked provided that two of conditions are satisfied, the conditions including
that the motion performed by the user matches the pre-registered first motion information,
that the motion performed by the user matches the pre-registered second motion information, and
that the motion performed by the user matches pre-registered third motion information.

11. The electronic key system according to claim 8,
wherein the one or more instructions cause the one or more processors to
execute, as the composite authentication process, a process that permits the door unit to be unlocked provided that two of conditions are satisfied, the conditions including that the motion performed by the user matches the pre-registered first motion information,
that the motion performed by the user matches the pre-registered second motion information, and
that the motion performed by the user matches pre-registered third motion information.

12. The electronic key system according to claim 1,
wherein the one or more instructions cause the one or more processors to
execute, as the composite authentication process, a process that permits the door unit to be unlocked provided that two of conditions are satisfied, the conditions including
that the motion performed by the user matches the pre-registered first motion information,
that the motion performed by the user matches the pre-registered second motion information, and
that the motion performed by the user matches pre-registered third motion information.

* * * * *